United States Patent [19]

Vaello

[11] Patent Number: 5,465,904
[45] Date of Patent: Nov. 14, 1995

[54] DOMESTIC WATERING AND AGRICULTURAL IRRIGATION CONTROL SYSTEM

[76] Inventor: Donald B. Vaello, 12000 Crown Point Dr., Suite 175, San Antonio, Tex. 78233

[21] Appl. No.: 161,722

[22] Filed: Dec. 3, 1993

[51] Int. Cl.⁶ .......................... B05B 12/12; A01G 25/16
[52] U.S. Cl. ................................. 239/69; 239/70
[58] Field of Search ............................. 239/63, 64, 67, 239/69, 70

[56] References Cited

U.S. PATENT DOCUMENTS

| | | | |
|---|---|---|---|
| Re. 31,023 | 9/1982 | Hall, III | 47/1 R |
| 4,396,149 | 8/1983 | Hirsch | 239/63 |
| 4,545,396 | 10/1985 | Miller et al. | 239/64 |
| 4,567,563 | 1/1986 | Hirsch | 364/420 |
| 4,755,942 | 7/1988 | Gardner et al. | 364/420 |
| 5,097,861 | 3/1992 | Hopkins et al. | 239/63 |
| 5,208,855 | 5/1993 | Marian | 239/69 |

*Primary Examiner*—Karen B. Merritt
*Attorney, Agent, or Firm*—Gunn, Lee & Miller

[57] ABSTRACT

An improved watering/irrigation control system for use in conjunction with automatic domestic lawn and plant watering systems and/or automatic agricultural irrigation systems that utilizes historical rainfall data and/or predictive rainfall data or restrictive watering data for a determination of when standard timed periodic irrigation or watering operations should be interrupted or withheld given the existence of sufficient rainfall already on the ground or a sufficient likelihood that such rainfall will occur within a predetermined period of time such that the normal watering or irrigation cycle is made unnecessary. The invention utilizes a coded signal transmitted from a centralized location or through common carriers; such as, cable, telephone, paging services, or radio and television broadcast that is received and interpreted by a local unit and utilized to provide predictive rainfall or restrictive watering information to a processor that activates or deactivates the standard timed watering or irrigation cycle. Such predictive rainfall or restrictive watering information may be used alone in a system or is combined with or supplements historical rainfall data in a manner that provides a more efficient watering or irrigation cycle and creates fewer watering cycles that end up being unnecessary in view of concurrent rainfall. This historical rainfall data processing system may be used alone to control watering and irrigation.

9 Claims, 8 Drawing Sheets

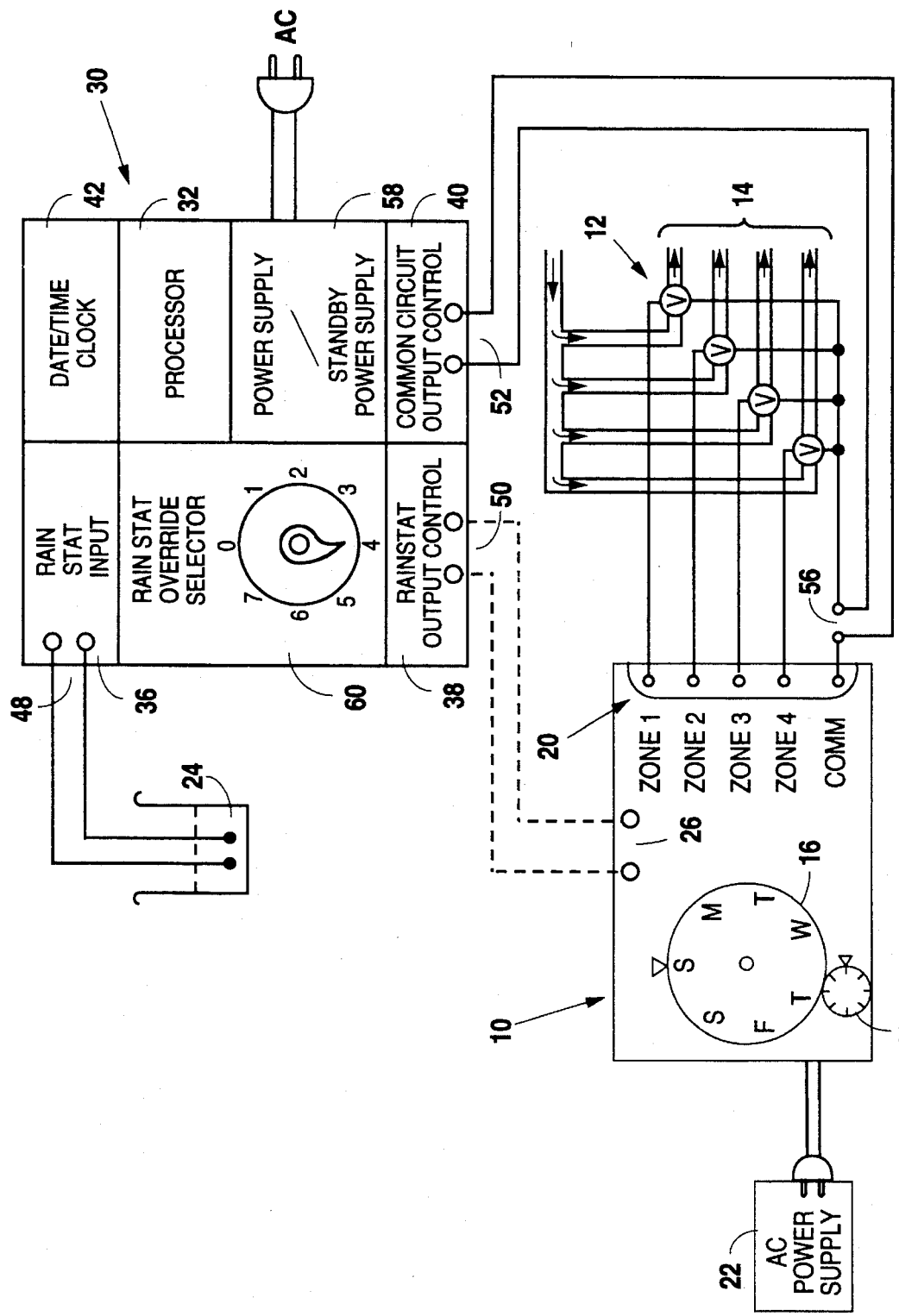

DOMESTIC WATERING AND AGRICULTURAL IRRIGATION CONTROL SYSTEM

BACKGROUND OF THE INVENTION

1. Field of the Invention

The present invention relates generally to a method and device for controlling the irrigation of plants in lawn care and in larger scale agricultural operations. The present invention relates more specifically to an improved irrigation control system that utilizes historical rainfall information and/or predictive rainfall information and/or restrictive watering information in determining an optimal irrigation plan.

2. Description of the Prior Art

Many systems have been developed to automatically control the distribution of water through irrigation means for both agricultural operations on a large scale and for individual domestic lawns on a small scale. These systems vary from exceedingly complex operations that incorporate soil moisture content sensors and field temperature measurements, to simple systems that operate strictly on a timed control basis. The effort in each of the past designs for such automated irrigation systems has been to minimize the need for human intervention in determining and effecting an optimal watering plan, such that labor costs are minimized and water usage efficiency is maximized.

Most irrigation control systems begin with basic timer circuitry that is capable of controlling one or a number of valves associated with water distribution conduits. In a typical domestic lawn watering system, a timer initiates a predetermined period of watering through the control of a valve connecting a water supply to a field of irrigation pipes and sprinkler heads. The typical timer system allows the user to set both the duration of the watering period and the frequency of the watering. A typical system may, for example, allow the user to water a lawn for a period of 45 minutes every Monday, Wednesday, and Friday during a week. Such timing systems can be combinations of mechanical and electrical devices that allow the user to simply switch days of the week in and out of the watering cycle and to switch the duration of the watering cycle in 5, 10, or 15 minute increments. Such systems might also be entirely electronic and may be capable of selecting a wide variety of watering plans from regular to completely random irrigation control.

It is also well known in the art to associate a watering or irrigation control system with a number of discrete irrigating pipe zones or fields. Whether by mechanical or electronic means, timing systems have been developed that switch various irrigation zones or fields on and off at regular intervals or in preplanned combinations. In this manner, watering control systems that may be of a relatively simple structure can be utilized to control and regulate the watering of domestic lawns or large scale agricultural operations in a manner that makes relatively efficient use of the water resources while minimizing labor costs associated with the manual operation of irrigation systems based upon human control.

Some irrigation and lawn watering systems have incorporated additional factors beyond preset time values, into the establishment of an irrigation plan. These external factors that figure into a determination of an irrigation plan have included rainfall measurements, soil moisture content measurements, temperature measurements, and other indications of the then existent need of the lawn or field for additional water. Some such systems have incorporated a simplified means for determining and acknowledging a historical rainfall amount, typically for a previous 24 hour period and the use of this information in "vetoing" the next watering cycle timed in the irrigation plan.

In its most simple form, lawn watering systems that incorporate rain stats can bypass a timed watering cycle when the water present in a rain stat is of a sufficient level. Such systems are typically limited to an acknowledgement of rainfall within the previous 24 hour period because of the necessity of resetting the system for subsequent rainfall measurements and the general assumption that any rainfall in earlier 24 hour periods of time would be of minimal relevance to the immediate water needs of the lawn or agricultural operation. Such rain stat operated systems have the drawback that differences in evaporation rates can significantly vary the appropriate impact that a given rainfall should have on a determination of additional irrigation quantities. In other words, a given quantity of rainfall at one time period during a day or at one time period during a particular season of the year, might result in water saturation for the plant life of a level sufficient that more than one cycle of the irrigation plan could be eliminated. On the other hand, evaporation rates during the afternoon in the summer time could be significant enough that no interruption of the standard watering cycle would be appropriate.

In order to overcome some of the drawbacks of these simple rain stat control systems, a number of improved irrigation control systems have incorporated soil moisture sensors in order to more accurately determine when additional irrigation is required. Such systems are typified by U.S. Pat. No. 4,396,149, issued to Hersch entitled "Irrigation Control System" as well as the companion U.S. Pat. No. 4,567,563 also entitled "Irrigation Control System". More complex systems that incorporate additional factors beyond simple soil moisture content include U.S. Pat. No. 4,755,942 issued to Gardner et al. entitled "System for Indicating Water Stress in Crops Which Inhibits Data Collection if Solar Insolation Exceeds a Range from an Initial Measured Value" and further in Reissue Patent No. 31,023, reissued on Sep. 7, 1982, to Hall entitled "Highly Automated Agricultural Production System". In these more complex patents, the systems described utilize not only soil moisture content, but canopy temperatures and soil temperatures for a more accurate determination of the water needs of the plant life being monitored.

Despite all of the various systems that have been developed to monitor the water needs of lawns and agricultural operations, it is nonetheless common place to see automated irrigation systems in full operation during rainfall. The reason for this is that none of the existing systems, regardless of their ability to determine historical rainfall amounts and soil moisture content are capable of storing historical rainfall data, of anticipating that rain will occur during an automated irrigation cycle, or of receiving a remote signal indicative of predictive rainfall data or restrictive watering data. There has heretofore not been disclosed in the prior art a means for bypassing or otherwise controlling an automatic irrigation system by storing and processing historical rainfall data, predictive rainfall data or restrictive watering data so as to appropriately preclude the implementation of that irrigation cycle. It would be desirable, therefore, to have a system capable of acknowledging historical rainfall data without the drawbacks of the prior art systems and utilizing such data to assist in the control and operation of an irrigation plan. It would be desirable to also use predictive rainfall data to create and execute an irrigation watering plan. It would be additionally desirable to have a system capable of utilizing historical rainfall data or a system with remote signaling which uses predictive rainfall data or restrictive watering data to control and operate an irrigation plan.

SUMMARY OF THE INVENTION

It is therefore an object of the present invention to provide an improved system for the watering or irrigation of lawns and plants and/or large scale agricultural operations that minimizes human intervention into the control of the irrigation system and maximizes the efficient use of water.

It is another object of the present invention to provide an improved irrigation/watering control system that incorporates historical rainfall data, predictive rainfall data and/or restrictive watering data, the latter two via remote signaling into an irrigation plan that more efficiently uses water resources in the system.

It is another object of the present invention to provide an improved irrigation/watering control system that utilizes a historical rainfall collection system which collects historical rainfall data, processes this data, and stores it to control the watering and irrigation of lawns and agricultural operations.

It is another object of the present invention to provide an improved irrigation/watering control system that utilizes predictive rainfall data for the purpose of preventing the activation of an irrigation cycle when such predictive information makes likely the needless watering of a lawn or agricultural operation when the possibility of rainfall on such lawn or agricultural operation is of a significant level.

It is another object of the present invention to provide an improved irrigation/watering control system that utilizes remotely signaled data for the purpose of controlling the water system during periods of community watering restrictions.

In fulfillment of these and other objectives, the present invention provides improved systems and methods for controlling the watering and irrigation of lawns and agricultural operations through the combination of different systems, such as an automatic timing control system, a historical rainfall collection system and a remote signaling reception system which is used as part of a predictive rainfall collection system or to provide restrictive watering information for the overall control of valve operated water distribution networks. The present invention may be based upon original equipment systems or upon a retrofit system capable of being utilized with standard watering/irrigation control systems. The present invention provides a means for utilizing standard timer control systems for the activation and deactivation of valves in an irrigation field and provides a means for measuring rainfall and incorporating such historical rainfall data into a decision making process for determining when and if irrigation cycles should be deactivated. The present invention further provides a means for receiving predictive rainfall information or restrictive watering information from a remote centralized signal location. By incorporating the predictive rainfall information or restrictive watering information into the decision making process, a watering/irrigation cycle can be deactivated when the predictive rainfall data is sufficiently high or when the restrictive watering information requires no watering. This system utilizes a receiver device for obtaining a coded signal from a centralized location that indicates to the system that rainfall predictions for a given area are sufficiently high, typically greater than some "percentage chance of rain" or that restrictive watering ordinances require no watering, such that the system can prevent an otherwise timed irrigation cycle from allowing the flow of water through an irrigation field. The device and method of the invention can be constructed within a complete irrigation or lawn watering control device or can be retrofit to existing devices that rely only upon timer control or only upon a combination of timer control and historical rainfall data.

Other objects of the present invention will become obvious to those skilled in the art upon the description of preferred embodiments below and a description of the appended drawings and the incorporated claims.

BRIEF DESCRIPTION OF THE DRAWINGS

FIG. 2 is a schematic diagram of the lawn watering/ agricultural irrigation system utilizing a historical rainfall collection and processing system described by the present invention shown retrofitted to the existing control systems described by the prior art as shown in FIGS. 1A and 1B.

DETAILED DESCRIPTION OF THE PREFERRED EMBODIMENT

Figure 1A:
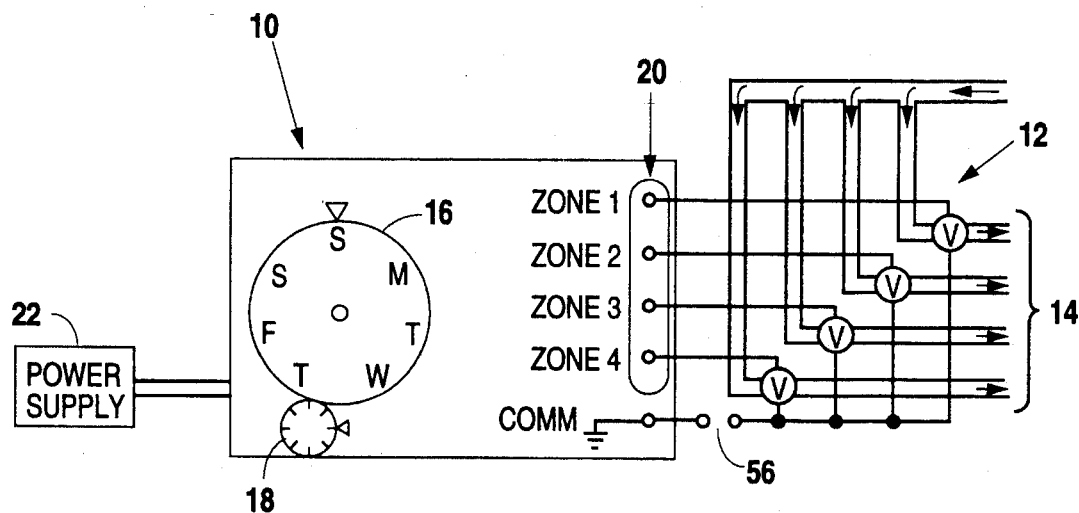
FIG. 1A is a schematic diagram of a typical lawn watering control system without a rain stat described in the prior art.
Figure 1B:
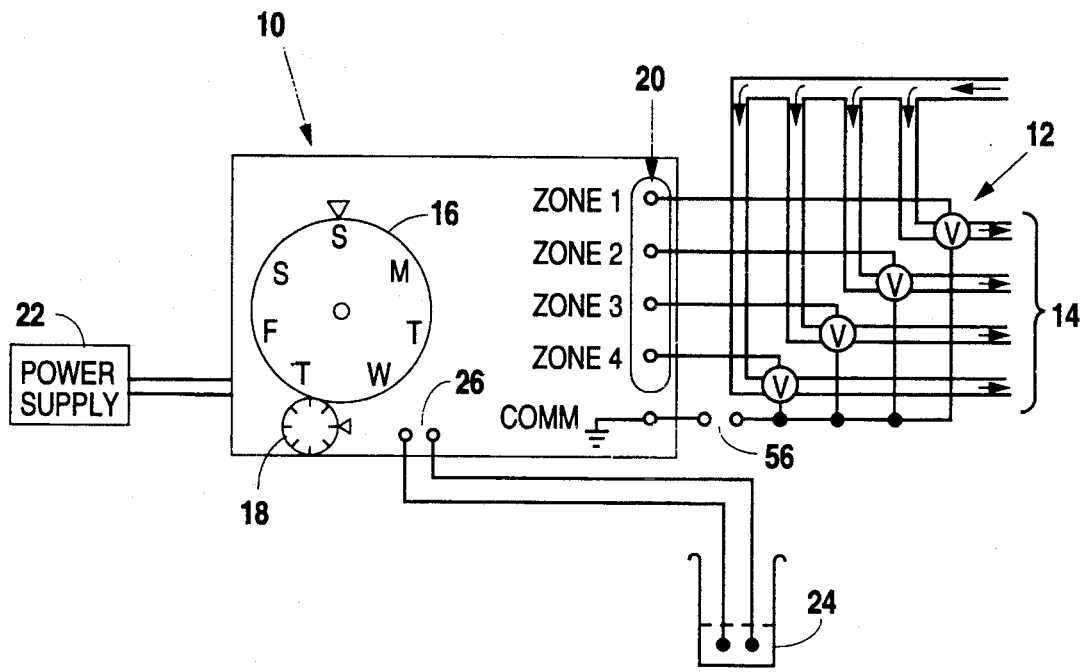
FIG. 1B is a schematic diagram of a typical lawn watering control system with a rain stat described in the prior art.

Reference is first made to FIGS. 1A and 1B for a brief description of typical systems disclosed by the prior art for the control of watering a lawn or irrigating an agricultural operation, The basic system incorporates a control system (10) and an array of valves (12) that activate or deactivate the flow of water through an irrigation system (14), The array of valves (12) typically controls a number of zones within the irrigation system (14) and in more complicated systems can specifically control individual zones at separate time intervals.

Control system (10) typically incorporates an interval timer (16) and a period timer (18) that in combination determine the appropriate activation of valve array (12) on an automatic basis. Interval timer (16) keeps track of a 24 hour time period and allows the user to determine and set the frequency with which the irrigation time period is to occur. As indicated in FIGS. 1A and 1B, this most commonly is done on a weekly basis with the user being able to select the days of the week that the watering or irrigation operation is activated.

Period timer (18) allows the user to select the duration of the watering operation that occurs at the interval selected by interval timer (16). The combination of these two timers for example could allow the user to select a 45 minute watering period (set by period timer (18)) to occur on Mondays, Wednesdays, and Fridays of the week (set by interval timer (16)). In mechanical/electrical control systems, interval timer (16) is commonly an array of switches that, depending upon whether they are open or closed, either activate or deactivate the watering cycle for a particular day. Likewise, the control of the watering time period with period timer (18) in a mechanical/electrical system is typically an array of switches that adds or subtracts 10, 15, or 30 minute intervals from the duration of the watering cycle. In more recent electronically controlled systems, interval timer (16) and period timer (18) are often solid state devices with electronic timing circuits that work in combination to keep track of the day of the week, the time period during the day, and the duration of the watering cycle once initiated. A great variety of such electrical/mechanical or electronic systems are available on the market and the schematic representation of these systems in FIGS. 1A and 1B is intended to be representative of the functional features of such systems.

The elements that such systems have in common generally include not only the control system (10) and some combination of interval timer (16) and period timer (18), but an array of electrical connections. (20) that allow for the electrical activation or deactivation of valve array (12) in irrigation system (14). Also typical of such systems is the necessity of connecting to a power supply (22) which may be either of the alternating current type or direct current type, depending upon the particular application.

In more refined systems as shown in FIG. 1B, additional information related to historical rainfall is gathered by the rain stat (24) and communicated to control system (10) through a first rain stat input (26). The first rain stat input (26) effectively provides a means for canceling a normally timed irrigation cycle when rainfall amounts in the rain stat (24) are above a particular level. Such a system could be as simple as a continuity probe at a particular level in the rain stat (24) that when shorted by the presence of water in the rain stat (24) closes a switch that deactivates the circuit that would normally activate valve array (12) on the timed basis. Typically such a rain data system is reliant on the evaporation of the water from the rain stat (24) or may involve a more complex means for physically eliminating the water from the rain stat (24) after a preset period of time.

Other systems that incorporate soil moisture content measurements, canopy temperature values, and plant temperature values likewise contribute this data to some means for deactivating an otherwise timed activation of the irrigation system.

Figure 3:
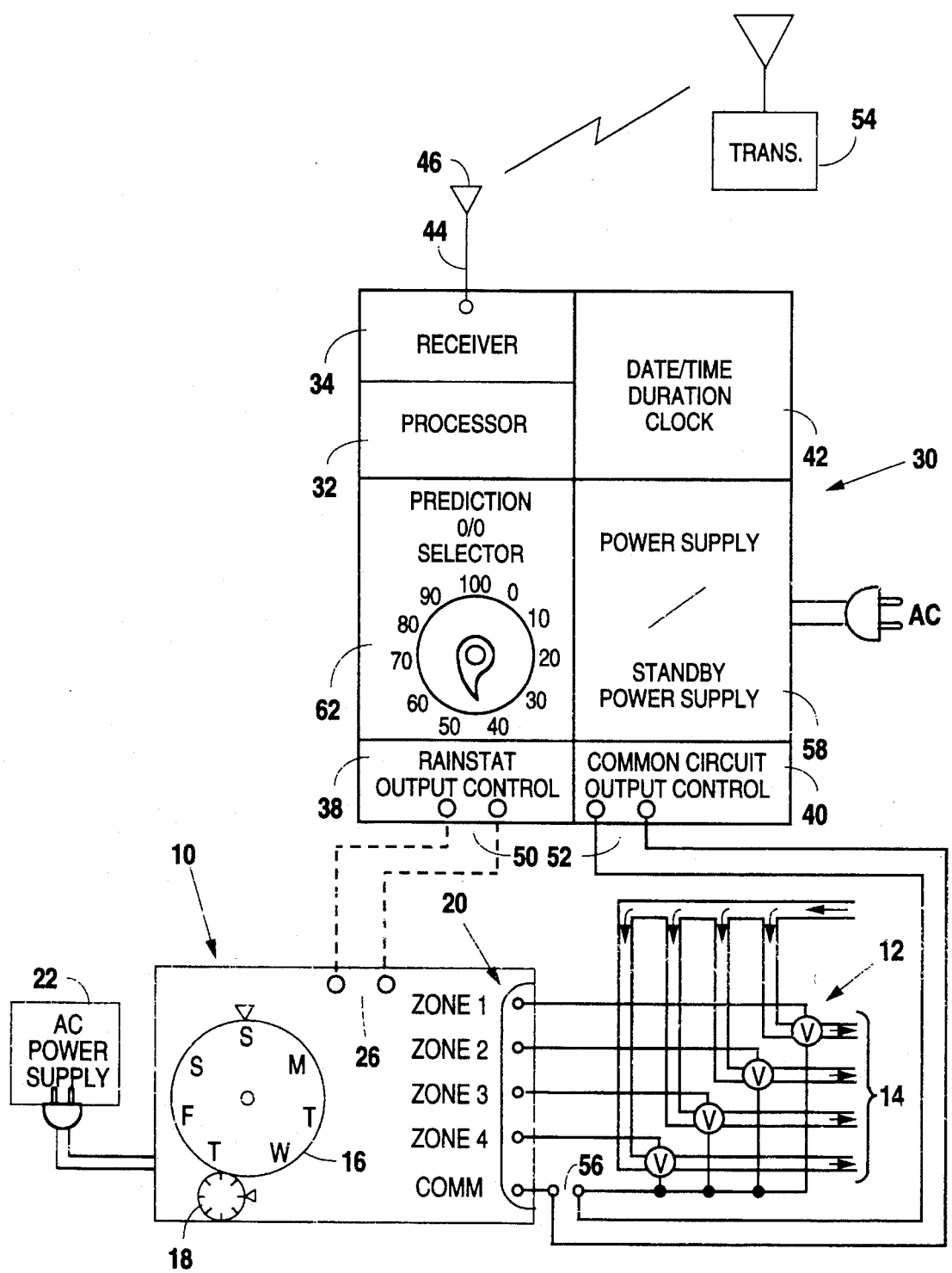
FIG. 3 is a schematic diagram of the lawn watering/ agricultural irrigation system utilizing a predictive rainfall collection and processing system described by the present invention shown retrofitted to the existing control systems described by the prior art as shown in FIGS. 1A and 1B.
Figure 4:
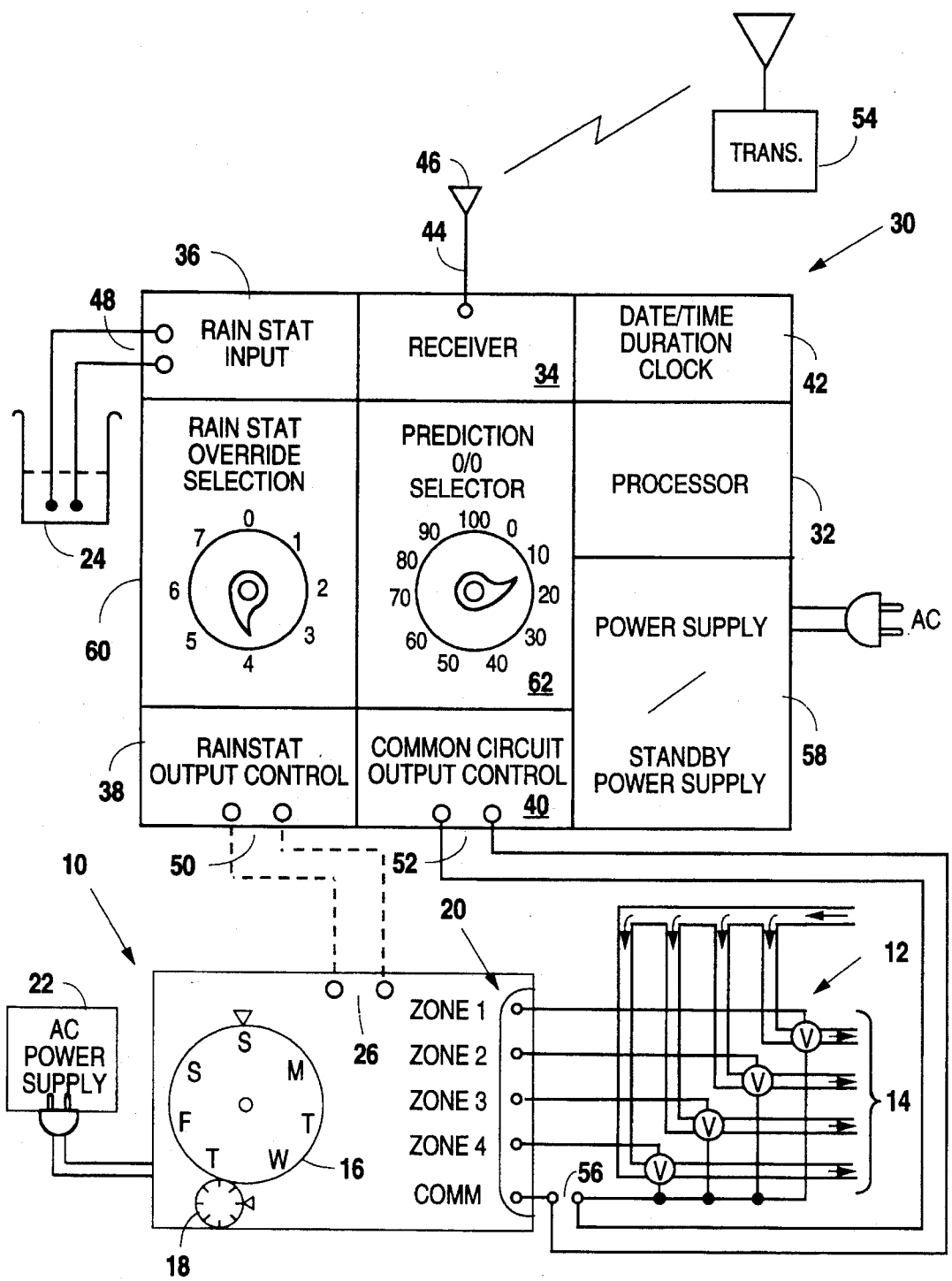
FIG. 4 is a schematic diagram of the lawn watering/ agricultural irrigation system utilizing both a historical rainfall collection system and a predictive rainfall collection with a processing system described by the present invention shown retrofitted to the existing control systems described by the prior art as shown in FIGS. 1A and 1B.

Reference is now made to FIGS. 2–4 for a detailed description of the apparatus elements and additional functions provided by the systems of the present invention designed to retrofit previously existing systems.

FIGS. 2–4 disclose the elements of each of the systems of the present invention shown as they might retrofit to the existing watering/irrigation control systems described with respect to FIGS. 1A and 1B.

If the existing irrigation system does not have a rain stat or if it has a rain stat which is incompatible with the unit of the present invention or a rain stat which lacks the precision required to function with the unit of the present invention, then a new rain stat will be included with the unit for the systems disclosed in FIGS. 2 and 4. If the existing irrigation system does have a compatible, precise rain stat, then the unit will be placed between the rain stat (24) and the first rain stat input (26) of the control system (10) in FIGS. 2 and 4. The system disclosed in FIG. 3 would not utilize a rain stat but rather only the elements required for the predictive rainfall collection system or the restrictive watering system.

In FIGS. 2–4, control system (10), which shall be hereinafter referred to as the primary control system (10), is still connected to valve array (12) which controls the flow of water through the irrigation field (14). These retrofit systems which are exemplified in FIGS. 2–4 would interact with the existing control system (10) at the common circuit control line (56) connected to valve array (12) if the existing system did not have a rain stat and at either the common circuit control line (56) or at the first rain stat input (26) if the existing system did have a rain stat. Each of these figures show supplemental control systems (30) interacting with primary control system (10) at both (26) and (56); however, in practice, only one of these routes of control would be used to interact with primary control system (10).

This allows the system of the present invention to maintain control of valve array (12) in one of two ways described in more detail below. The supplemental control system (30) contains its own power supply/standby power supply (58) and thus can provide its own power. The same power supply (22) that provides power to primary control system (10) could provide power to the supplemental control system (30) of the present invention if sufficient voltage and current requirements are met.

The supplemental control system (30) as shown in FIG. 4 of the present invention, which contains the historical rainfall collection and processing system and the predictive rainfall data system, is comprised of control processor (32), signal receiver (34), the second rain stat input (36), rain stat output control (38), common circuit output control (40), date/timer clock (42), a power supply/standby power supply (58), a rain stat override selector (60) and a prediction percentage selector (62). Associated with the supplemental control system (30) is cable (44) which connects and relays a signal transmitted from a remote signal transmitter (54) from antenna (46) to receiver (34). Also associated with supplemental control system (30) is rain stat input (48) which connects the second rain stat input (36) to rain stat (24). Rain stat output (50) connects the first rain stat output control (38) to rain stat input (26) of the primary control system (10). Common circuit output (52) connects common circuit output control (40) to a common circuit control line (56) in conjunction with valve array (12).

The supplemental control system (30) of the present invention as disclosed in FIG. 2 discloses only a retrofitted historical rainfall collection and processing system. Thus, this system only contains the following elements of supplemental unit (30): (32), (36), (38), (40), (42), (48), (50), (52), (58) and (60) and a rain stat (24).

The supplemental control system (30) of the present invention as disclosed in FIG. 3 discloses only a retrofitted predictive rainfall collection and processing system which can also can receive restrictive watering data. Thus, this system only contains the following elements of the supplemental unit (30): (32), (34), (38), (40), (42), (44), (46), (50), (52), (58) and (62) and a signal transmitter (54) which is not actually part of the system but is necessary for operation.

As stated above, a signal transmitter is necessary for the operation of the systems as shown in FIGS. 3 and 4. This transmitter may be comprised of existing radio frequency transmitters associated with the National Weather Service or other available common carriers; e.g. cable, telephone, paging services, commercial radio and television, etc. The use of these existing transmitters in conjunction with the present invention is described in more detail below. The system herein described utilizes a wireless transmitter and receiver.

As indicated above in a retrofit environment, as shown in FIGS. 2 and 4, supplemental control system (30) of the present invention interacts with primary control system (10) in one of a possible two ways depending upon whether the existing system has a rain stat or not. Primary control system (10) is assumed to continue its timed control of valve array (12) by way of electrical connections (20) for activating and deactivating the flow of water in irrigation field (14). A first means already incorporated in primary control system (10) for interrupting this timed activation/deactivation of valve array (12) is present at the first rain stat input (26) if a rain stat is present in the existing system. Whereas primary control system (10) would normally receive input at the first rain stat input (26), the supplemental control system (30) replaces a direct connection to rain stat (24) with an intermediate connection to rain stat output control (38) which mimics an output signal that might be created by rain stat (24) in a conventional connection to the first rain stat input (26). As will be described in more detail below, this connection allows supplemental control system (30) to actually control valve array (12) when historical rainfall is of a given amount or, when based upon collected information, supplemental control system (30) determines it to be appropriate to "deceive" primary control system (10) in to thinking that a given level of rainfall has occurred within the last 24 hour period. Further, in the systems exemplified in FIGS. 2 and 4, supplemental control system (30) contains a rain stat override selector (60) which allows the user to set the number of days which the system should be turned off once a given amount of rain has fallen. The date/time clock (42) functions as an integral part of the system by keeping track of the date and time incoming data is received.

A further improvement of the present invention is seen in the ability of supplemental control system (30), as shown in FIGS. 2–4, to provide a second means for overriding the timed activation/deactivation cycle of primary control system (10) through the interruption of electrical circuits associated with valve array (12) at common circuit control line (56).

The process and apparatus of the present invention may seek cooperation with existing National Weather Service radio broadcast systems for the utilization of a coded frequency signal of short term duration to be received by receiver (34) in supplementary control system (30) of the present invention. The National Weather Service of the United States currently has in place broadcast transmitters that operate on six frequencies in the 162 megahertz range and provide weather band radio receivers with information related to weather forecasts, temperatures, tides, etc., for a particular area of the country. The weather bands identified in the United States to carry this information are standardized throughout the country such that specifically designed weather band radios are manufactured and marketed for the purpose of receiving and amplifying these weather forecast broadcasts.

The present invention anticipates and utilizes the incorporation of a brief signal tone to be generated at regular intervals from a centralized location or possibly during the broadcast of the existing weather forecast information, such tone being received and recognized by receiver (34) of the present invention. This centralized location could receive the predictive rainfall or restrictive watering information and could convert this information into specific tones. The centralized location could broadcast specific tones indicative of a specific percentage chance of rainfall or specific watering restrictions. This frequency tone when picked up by antenna (46) and carried by way of cable (44) into receiver (34) of the present invention is identified as an indication of a prediction of expected rainfall within a selected future period of time or an indication of watering restrictions for a future period of time. When utilizing predictive rainfall information, this tone could be, as in the preferred embodiment, a simple activation/deactivation tone indicative of a rainfall chance in excess of a preselected percentage level, which is set by adjusting the prediction percentage selector (62). For example, should it be determined that any rainfall predictions in excess of "70% chance of rain" are sufficient to preclude a timed watering or irrigation in a geographic area, then the tone would simply be broadcast upon such prediction by the National Weather Service. In other words, if the chances of rain are 70% or greater for a given geographic area, the National Weather Service or the centralized location would broadcast the tone that would be recognized by the supplemental control system (30) of the present invention and would be processed by control processor (32) so as to cause common circuit output control (40) to maintain common circuit control line (56) open which would otherwise provide electrical continuity to valve array (12). In the preferred embodiment, this signal provided at output (52) would simply be an open or closed circuit that would allow current to flow through valve array (12) or not allow current to flow, as the case may be. Alternatively, the tone would be processed by control processor (32) so as to cause the rain stat output control (38) to close the circuit through the first rain stat input (26) thus shutting off the valve array (12).

In an alternative embodiment in which the user of supplementary control system (30) could select the prediction level by setting the prediction percentage selector (62) at which deactivation of the timed system would be made, the coded signal transmitted and received could be variable and related to the percentage level for the chances of rain in a particular geographic area. For example, a tone of one frequency might be generated for rain chances in excess of 20%, while a distinctive tone might be generated for rain chances in excess of 60%. A plurality of frequencies might be utilized for tones to be generated for rain changes at 10% to 20% intervals from 0% to 100%. The user could, therefore, adjust the prediction percentage selector (62) and therefore common circuit output control (40) so as to output an open signal at (52) upon the reception of prediction information above a preselected percentage level. In other words, the user could select rain chances of 60% or greater (as an example) as the trigger level for deactivating the normal timed irrigation sequence. The user would anticipate that a rain chance of 60% or greater would be sufficient to preclude watering or irrigating on the significant likelihood that natural rainfall will provide the necessary water and that irrigation would only duplicate such water amounts. In this manner, the user may also entirely deactivate the predictive information as a factor to be utilized in a determination of the irrigation plan by setting the preselected value to 100%.

In a further alternative embodiment, the user of the supplementary control system (30), as shown in FIGS. 3 and 4, could further control the watering system by tones broadcast from the centralized location which relayed information to preclude or resume watering or irrigation based upon community or area watering restrictions.

As is clear from the above description of supplementary control system (30), as shown in FIG. 4, processor (32) could, upon the reception of predictive rainfall information or restrictive watering information that would normally trigger a deactivation of the timed circuitry, instead transmit a rain stat output by way of the first rain stat output control (38) to rain stat input (26) of primary control system (10) that would create the same situation as if rainfall had actually fallen in the previous 24 hour period in a level sufficient to deactivate the timed sequence. In other words, an alternative means for deactivating the circuitry necessary to activate valve array (12) could be accomplished by way of the first rain stat input (26) rather than common circuit control line (56).

Both of the above mechanisms for achieving the same deactivation of the circuitry are disclosed in the preferred embodiments simply because some existing primary control systems (10) do not incorporate the first rain stat inputs (26) and therefore the present invention would require the alternative means defined by common circuit output control (40) to provide the necessary deactivation of the normal timed irrigation sequence at the common circuit control line (56). While there would be nothing detrimental in effecting a multiple means for deactivating the time sequence, it is to be made clear that rain stat output control (38) in some ways duplicates the process achieved by common circuit output control (40). It is possible in fact that rain stat output control (38) would signal primary control system (10) to deactivate the normal timed irrigation sequence in response to historical rainfall data and at the same time common circuit output control (40) would deactivate valve array (12) based upon predictive rainfall information and/or restrictive watering information.

Again, it is to be remembered that the operation of the apparatus and method of the present invention could be accomplished in a system originally manufactured to incorporate all of the improvements described herein as well as in a system retrofit to an existing watering or irrigation control system with or without rain stat inputs.

Figure 5:
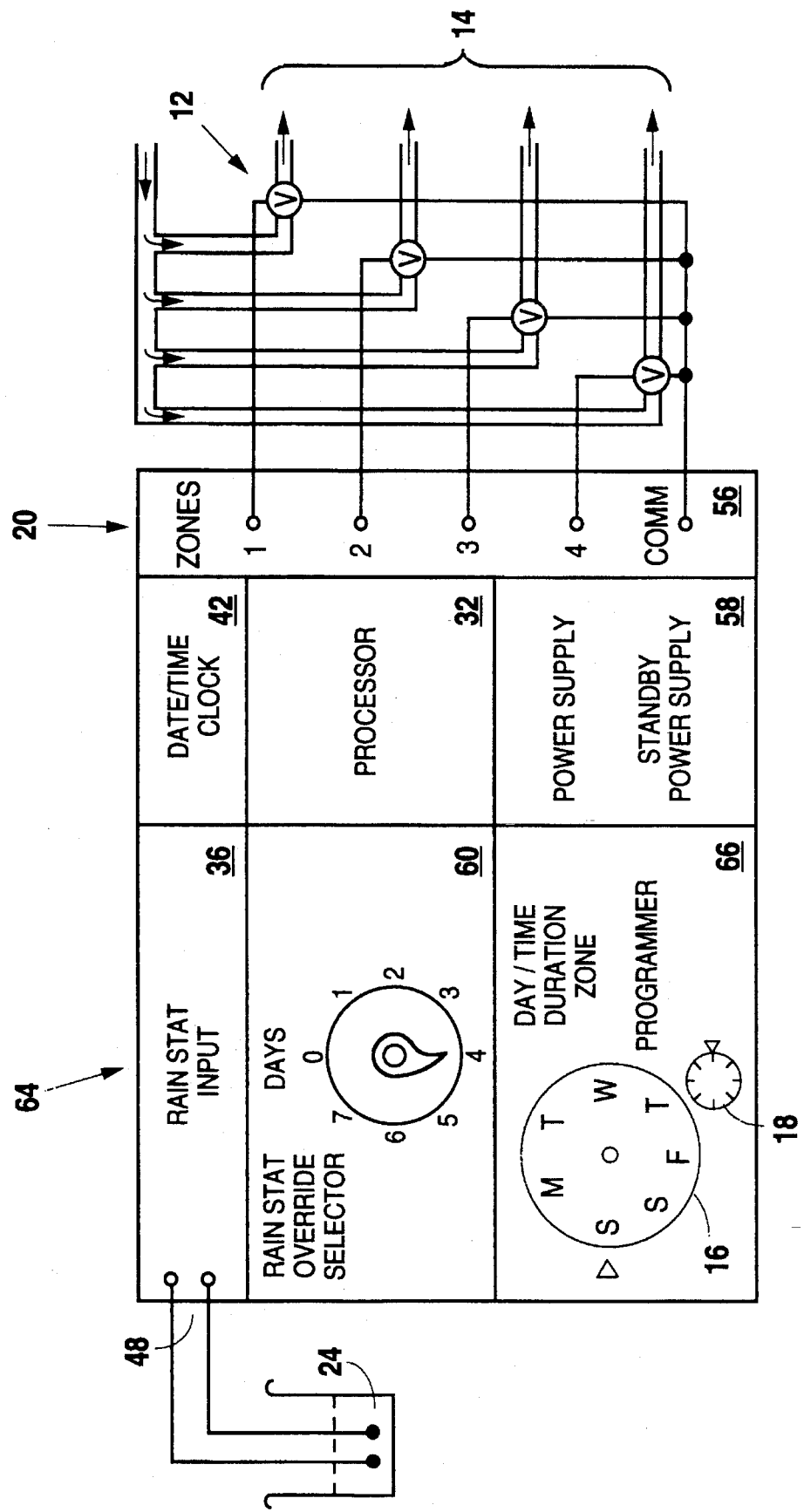
FIG. 5 is a schematic diagram of the lawn watering/ agricultural irrigation system utilizing a historical rainfall collection and processing system described by the present invention.
Figure 6:
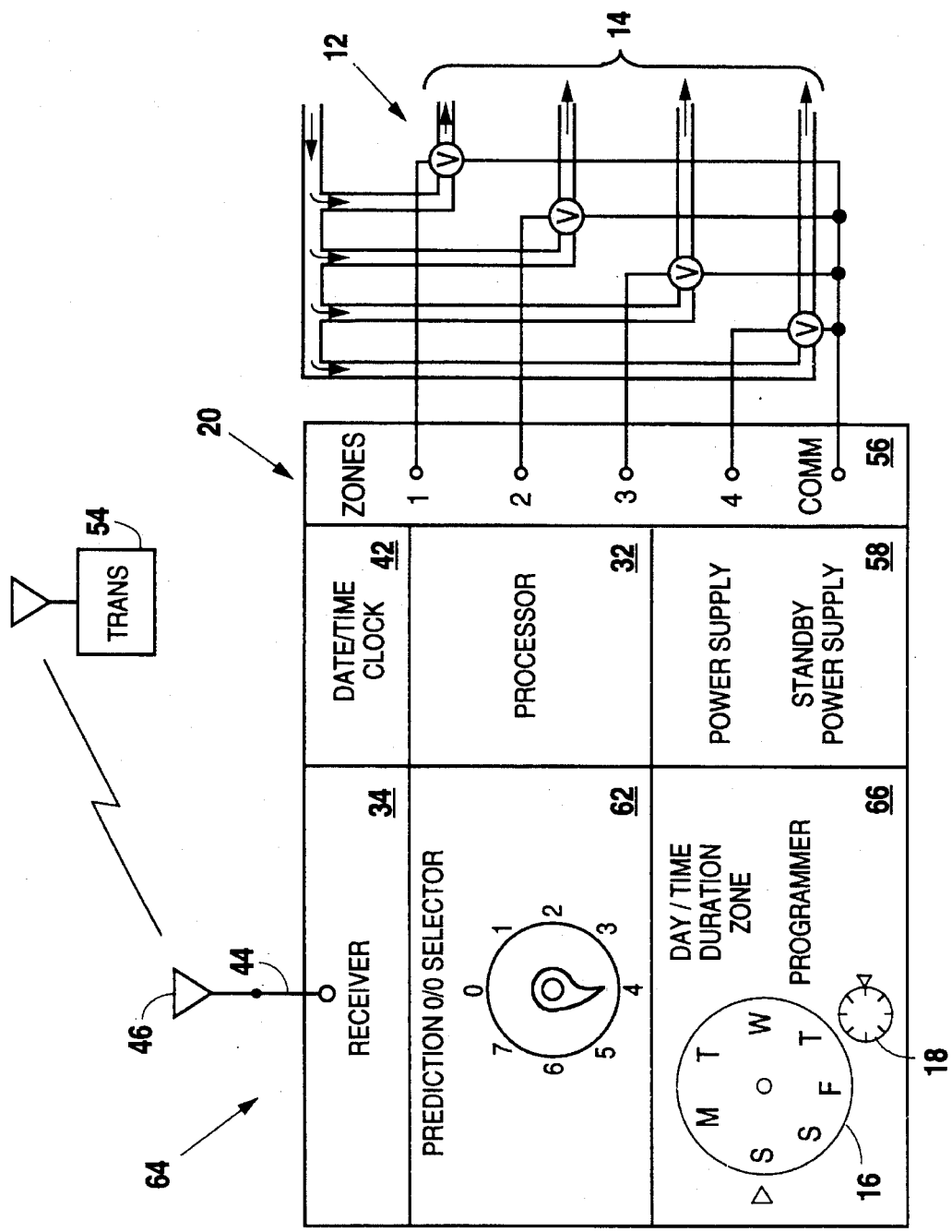
FIG. 6 is a schematic diagram of the lawn watering/ agricultural irrigation system utilizing a predictive rainfall collection and processing system described by the present invention.
Figure 7:
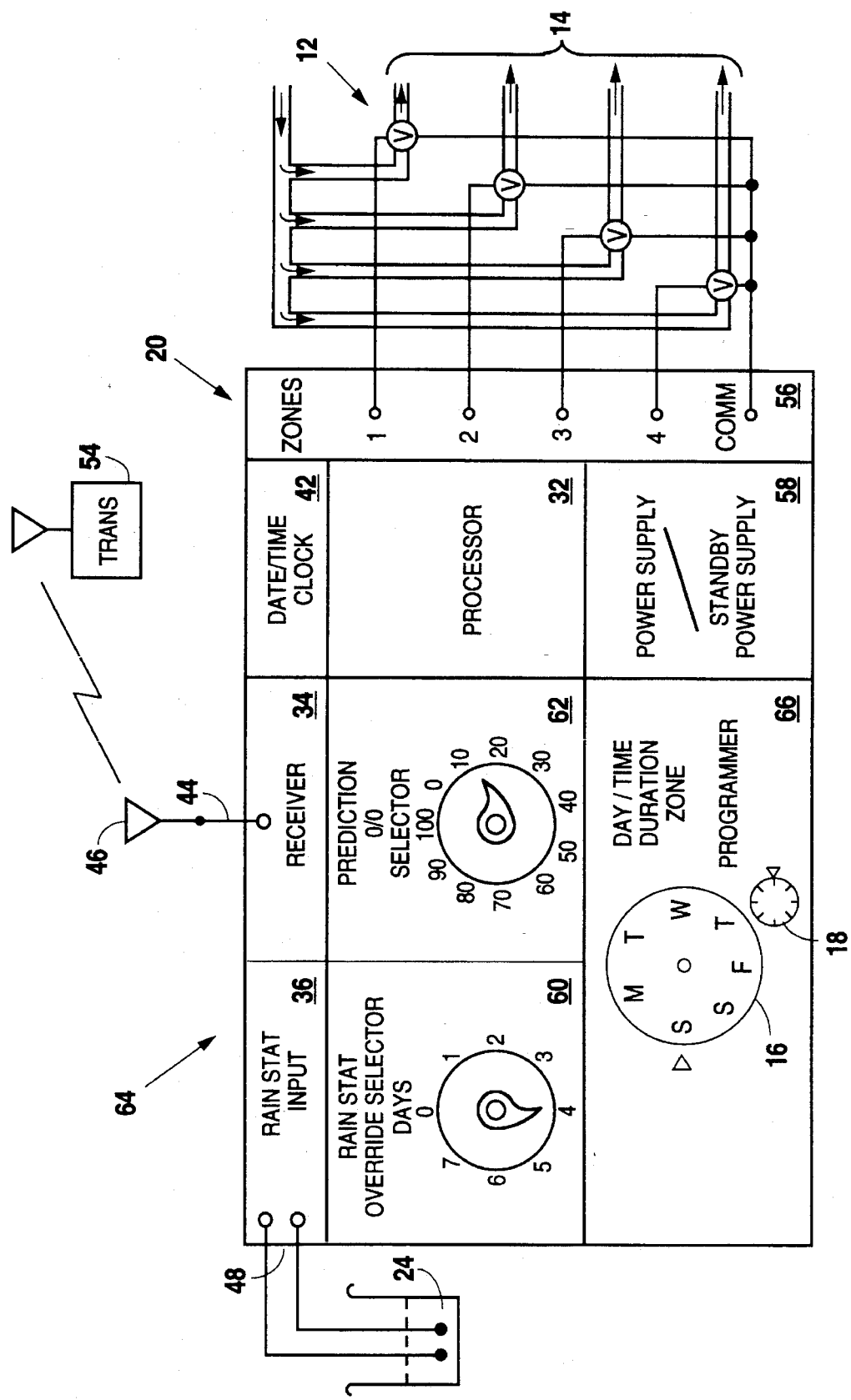
FIG. 7 is a schematic diagram of the lawn watering/ agricultural irrigation system utilizing both a historical rainfall collection system and a predictive rainfall collection with a processing system described by the present invention.

Reference is now made to FIGS. 5–7 for a detailed description of the apparatus elements and additional functions provided by the single original control systems (64) of the present invention. These systems contain all of the features of their respective retrofitted control systems (30) and in addition contain the day time duration zone programmer (66), the valve array (12), the water flow channels (14), the electrical connections (20) and the common circuit control line (56) contained internally. The day time duration zone programmer (66) contains a combination of interval timer (16) and period timer (18) as contained in the time control system (10) of the retrofitted system. The retrofitted system disclosed in FIG. 2 corresponds to the stand alone system disclosed in FIG. 5, likewise the retrofitted system disclosed in FIG. 3 corresponds to the stand alone system disclosed in FIG. 6 and the retrofitted system disclosed in FIG. 4 corresponds to the stand alone system disclosed in FIG. 7.

The stand alone systems would operate as their retrofitted counterparts with the exception that all of the control and settings are within one system (64).

Figure 8:
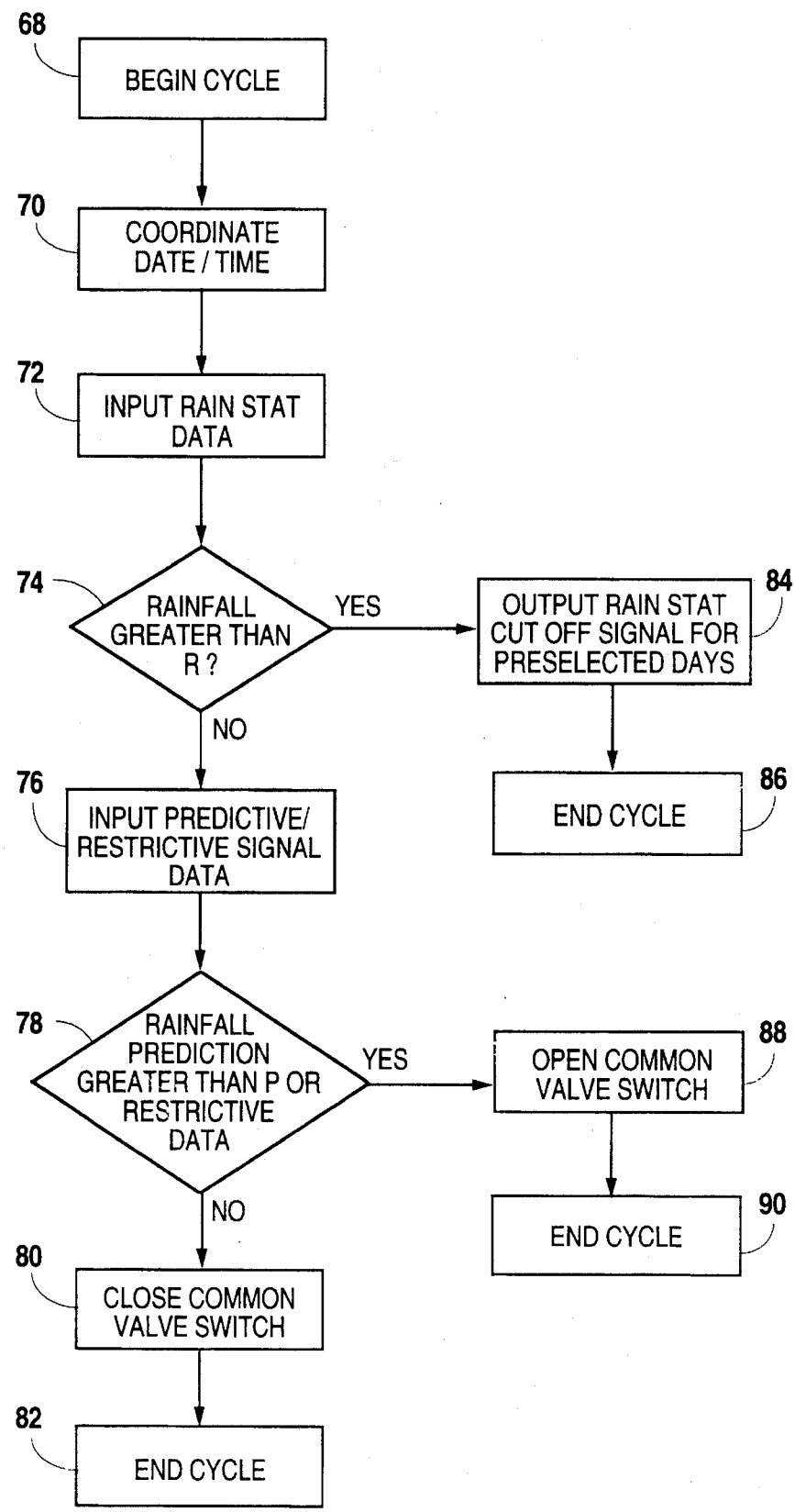
FIG. 8 is a flow chart of the primary decision making process described by the method of the present invention.

Reference is now made to FIG. 8 for a general description of the primary steps involved in the decision making process of the present invention. Overall, the method of the present invention is best repeated on a 24 hour cycle or a cycle of any other predetermined duration, that begins with the input and consideration of data and ends with a decision to activate or deactivate an automatically timed watering/irrigation operation.

The primary steps would vary based upon the elements present in each of the disclosed systems. The steps in FIG. 8 are representative of the systems described in FIGS. 4 and 7 which contain both aspects of the invention. The systems described in FIGS. 2 and 5 would utilize steps 68-74 and 80-86 whereas the systems described in FIGS. 3 and 6 would utilize steps 68, 70, 76-82, 88 and 90.

The process of the present invention is initiated at step (68) at the beginning of a cycle of a predetermined time period. Initially in step (70), date and time values are coordinated within the operating system or between the supplementary control system (30) and primary control system (10) in any of FIGS. 2–7. Step (70) of coordinating the date and time is simply established to ensure that any day of the week or time of day factors that are programmed into the system are not jeopardized by discrepancies between such values between one component of the system and another. In a preferred embodiment, therefore, that might be retrofit to an existing control system (10), confirmation of the congruency of the date and time values in the supplementary control system (30) and the date and time values in the primary control system is made.

The supplementary control system (30) then proceeds to step (72) for the input of rain stat data from rain stat (24) and for the input of rain stat override data. This allows the system of the present invention to consider historical rain data to determine whether or not the normal timed water cycle should be interrupted and for how many days. The system is preprogrammed with a rain level amount "R" and with a number of days that the system should be interrupted should the rain level be met. In step (74) the processor determines whether or not the rainfall measured is greater than this predetermined level "R". If the historical rain data is not greater than the stored value of "R", the processor next proceeds to step (76) for the input of the predictive or restrictive signal data.

It is anticipated that receiver (34) by way of antenna (46) is capable of receiving signal information from signal transmitter (54) and storing this information for a predetermined period of time. In other words, it is not necessary that processor (32) proceed in sequence through step (76) of inputting predictive or restrictive data simultaneously with the reception of such data by receiver (34). Although it is anticipated that this information is repeated throughout a 24 hour period of time by signal transmitter (54), the step (76) of inputting this signal data can be understood as the input from a stored location of the most recent signal data received.

Processor (32) then proceeds to step (78) and a determination of whether the rainfall prediction data is greater than some preset preselected value. As indicated above, in one embodiment of the present invention, the user can preselect through the prediction percentage selector (62), a value at which modification of the normal watering cycle occurs. For example, if selected by the user, the value of "P" could be 70% in which case only upon the reception of a signal that the rain fall chance is greater than or equal to 70% would the system interrupt normal timed activation of a watering sequence. The normal timed activation of the watering sequence could also be interrupted if the signal received indicates that watering restrictions in the area are in effect. If the rainfall prediction value is not greater than the stored "P" value or the restrictive data does not require an interruption of the normal watering cycle, then the processor proceeds to step (80) and closes the common valve circuit switch at (52) and (56) thereby allowing the normal watering/irrigation sequence to proceed. Processor (32) then proceeds to the end of cycle at step (82) and waits a period of time for the cycle to repeat by returning to step (68) above.

Should the rainfall value as input in step (72) be greater than "R" as determined in step (74), than the processor proceeds to step (84) and outputs the rain stat cut off signal by way of output (50) to rain stat the first input (26) for the preselected number of days. This serves to interrupt the normal sequence of timed control of the watering/irrigation operation.

Given that the rainfall is determined not to be greater than some preset value "R", the process proceeds to a determination of the rainfall prediction values. If the rainfall prediction values last received by receiver (34) are greater than the preset value "P" or the water restriction information requires that no watering occurs, than processor (32) generates a signal that opens common valve switch at (52) and (56) as seen in step (88). This step (88) as with step (84) interrupts the normal operation of the timed watering/irrigation sequence. Thereafter, again as in step (86), step (90) provides for the end of the cycle and an appropriate waiting period before the cycle is once again begun at step (68).

It is anticipated in the preferred embodiment that, although a standard cycle duration might be 24 hours, any cycle duration as preselected through primary control system (10) and supplemental control systems (30) or (64) could be implemented. Depending upon factors such as the irrigation field size, the type of crop, the nature of the domestic lawn, etc., the watering cycle may be of a greater or longer duration. As most existing systems are commonly based upon a 24 hour period and the operator is allowed to select the operation of the cycle on a day of the week basis, the preferred embodiment of the present invention is structured so as to function in association with this somewhat standardized approach. It can be seen, however, that regardless of the timed method for implementing automatic watering or irrigation, the present invention provides a means for the interruption of such a system at one of a number of different points in a manner that allows the system to incorporate historical rainfall information and/or predictive information and restrictive watering information and to forego a normal watering cycle if such information is sufficiently indicative of the likelihood that no watering would be necessary.

Current National Weather Service methods for predicting the chances of rainfall are to a great extent misunderstood by the general public. A 60% chance of rain generally translates into a prediction that 60% of the area covered by the prediction will experience rain during a future period of time. Even a 90% chance of rain, therefore, does not create a certainty that any particular area within the geographic region covered will receive rain during that future period of time. There will, in fact, be 10% of the area covered that will likely not receive rain during that future period of time.

Refinements of the present invention could be made, therefore, by narrowing the geographic region that a particular signal transmitted by the National Weather Service is intended to cover. If, for example, the geographic region over which a typical broadcast by the National Weather Service covers experiences weather patterns related to topographical contours, the signal presented could be further distinguished by the topographical area and the weather systems likely to be encountered there. For example, in a coastal region that incorporates not only level areas associated with a coastal plane, but mountainous or hilly areas adjacent such coastal planes, the rainfall predictions for the area could be based as much upon whether the location is in the mountainous region or the coastal region of the area. Therefore, in conjunction with the broadcast received by both the coastal plane area and the mountainous area a distinctive coded signal could be intended for those receivers located in the mountainous region versus those receivers located in the coastal plane region. While it would be difficult to standardize this coding for all areas covered by the National Weather Services broadcast, it would be a simple matter of establishing as many as five or more regions within a broadcast area, each of which could by public identification be defined to identify a particular subarea within the geographic region. The standard broadcast would actually include a total of five or more signals, one for each of the subregions within a general area covered by the broadcast. If, for example, only three distinct rainfall regions might be appropriate in a given area, the remaining portions of the signal could be newlywed with some nominal frequency signal that is ignored by the receiving units. The standard receiving unit would be programmed to receive a total of five (or more) signals, would be programmable by its user to utilize but one of the five signals and to ignore the balance in a determination of an appropriate rainfall prediction for the area of concern.

In addition, during periods of community water control discrete signals could be transmitted to permit irrigation of residential lawns versus commercial lawns or the cancellation of both.

In a further extension of the preferred embodiment of the present invention, the processor utilized to control and interpret the information associated with historical rainfall data and predictive rainfall data could be programmed to "learn" the accuracy of information provided by the National Weather Service predictive data for the specific region that the receiver is located in. If over a period of time predictive data is shown to be more or less reliable based upon accumulated rainfall historical data by way of rain stat information, then the processor of the present invention can itself modify its reliance on signals received from a broadcast from the National Weather Service, a centralized location or a common carrier. If, for example, a processor previously selected to inhibit watering or irrigation when predictions are in excess of 70% determines that more often than not no rainfall occurs after such prediction the processor could step up its triggered value to 80% chance of rain to provide a more accurate and appropriate interruption of the standard timed watering or irrigation cycle.

It can also be anticipated that with specialized control systems already on the market, the present invention could provide a means for interrupting the normal control cycle based upon the reception of predicted rainfall or restrictive watering information in any of a number of ways. Although electrically controlled water valves have been used as the means for activating and deactivating watering and irrigation in the preferred embodiment, alternative control means that may be utilized in existing control systems could be easily controlled through whatever the most appropriate manner of interrupting the standard operation of the system would be. It is anticipated that those skilled in the art will conceive of appropriate interface structures that would allow the improvements of the present invention to be retrofit to any of a number of existing watering/irrigation control systems. It is also anticipated that those skilled in the art would conceive of further modifications to the basic structure and method of the present invention to enhance the efficiency of any of a number of automatic watering and irrigation control systems while at the same time maintaining the automatic features thereof that eliminate the need for extensive human intervention.

I claim:

1. A system for controlling the distribution of water for lawn care or for agricultural operations in an irrigation system, wherein said system utilizes measured rainfall data, predictive rainfall data and restrictive watering data to control said distribution of water and wherein said predictive rainfall data and said restrictive watering data are received as a coded signal from a remote, centralized signal transmitter, said system, comprising:

a timer means for periodically activating a flow of water in said irrigation system;

a rain stat for obtaining measured rainfall data and a means for communicating a level of rainfall within said rain stat to a processor means;

a signal receiver capable of receiving a signal transmitted by said signal transmitter and capable of decoding said signal and a means for communicating said decoded signal to said processor means, wherein said decoded signal provides said predictive rainfall data and said restrictive watering data;

a prediction percentage selector which can be preset at the percentage level for the chance of rain at which normal operation of said timer means should be interrupted when said predictive rainfall data exceeds said preselected percentage level;

said processor means utilizing said measured rainfall data, said predictive rainfall data and said restrictive watering data to determine appropriate interruptions in said periodic activation of said irrigation system effected by said timer means;

wherein said processor means interrupts the normal operation of said timer means when at least one of said measured rainfall data and said predictive data exceeds a preselected level and said restrictive data indicates that watering restrictions are in effect which makes unnecessary a timed irrigation.

2. The irrigation control system of claim 1, wherein said system additionally comprises a rain stat override selector which can be preset to determine the number of days for which said normal operation of said timer means should be interrupted when said measured rainfall data exceeds said preselected level.

3. The irrigation control system of claim 1, wherein said timer means comprises:

an irrigation interval timer, said interval timer capable of deactivating said flow of water in said irrigation system after a preselected period of time within which said flow of water in said irrigation system was active; and a periodic irrigation timer, said periodic timer capable of selecting a time period for which an irrigation cycle is repeatedly initiated; wherein a combination of said interval timer and said periodic timer establishes a base line irrigation plan, wherein said flow of water in said irrigation system occurs at periodic times for specified intervals of time.

4. A system for controlling the distribution of water for lawn care or for agricultural operations in a irrigation system wherein said system utilizes measured rainfall data, predictive rainfall data and restrictive watering data to control said distribution of water and wherein said predictive rainfall data and said restrictive watering data are received as a coded signal from a remote, centralized signal transmitter, said system comprising:

an array of irrigation lines arranged so as to provide water to said lawn or said agricultural operations when said distribution of water is activated within said irrigation system;

a valve array, said valve array associated with said irrigation lines and operative so as to activate or deactivate said distribution of water within said irrigation lines;

a timer means for periodically activating a flow of water in said irrigation system, comprising an interval timer capable of selecting a duration of said distribution of water in said irrigation system and a periodic timer capable of selecting a period of time between activations of said distribution of water;

a rain stat for obtaining measured rainfall data and a means for communicating a level of rainfall within said rain stat to a processor means;

a signal receiver capable of receiving a signal transmitted by said signal transmitter and capable of decoding said signal and a means for communicating said decoded signal to said processor means, wherein said decoded signal provides said predictive rainfall data and said restrictive watering data;

a prediction percentage selector which can be preset at the percentage level for the chances of rain at which said normal operation of said timer means should be interrupted when said predictive rainfall data exceeds said preselected percentage level;

at least one rainfall bypass switch, said bypass switch capable of deactivating an otherwise activated flow of water as determined by said timer, said at least one rainfall bypass switch connected to both said rain stat and said signal receiver;

said processor means for utilizing said measured rainfall data, said predictive rainfall data and said restrictive watering data to determine appropriate interruptions in said periodic activation of said irrigation system effected by said timer means;

wherein said processor means interrupts the normal operation of said timer means when at least one of said measured rainfall data and said predictive data exceeds a preselected level and said restrictive data indicates that watering restrictions are in effect which makes unnecessary a timed irrigation.

5. The irrigation control system of claim 4, wherein said system additionally comprises a rain stat override selector which can be preset to determine the number of days for which said normal operation of said timer means should be interrupted when said measured rainfall data exceeds said preselected level.

6. A method for controlling the distribution of water for lawn care or for agricultural operations in an irrigation system, wherein said system utilizes measured rainfall data, predictive rainfall data and restrictive watering data to control said distribution of water and wherein said predictive rainfall data and said restrictive watering data are received by a signal receiver as a coded signal from a remote signal transmitter and decoded, comprising:

selecting a time period for periodic activation of a flow of water in said irrigation system;

selecting a time interval for duration of said activated flow of water in said irrigation system on a periodic basis;

activating a flow of water in said irrigation system for said time interval at said periodic times through activation of a valve array in said irrigation system;

obtaining said measured rainfall data from a rain stat, and obtaining said predictive rainfall data and said restrictive watering data from said decoded signal from said signal receiver;

communicating said measured rainfall data, said predictive rainfall data and said restrictive watering data to a processor means;

comparing said measured rainfall data to a preselected rainfall level and comparing said predictive rainfall data to a preselected percentage level;

deactivating said time period for periodic activation when said measured rainfall data exceeds said preselected rainfall level, when said predictive rainfall data exceeds said preselected percentage level and when said restrictive watering data indicates that watering restrictions are in effect; and resetting said preselected rainfall level upon initiation of a new periodic time period for periodic activation.

7. The method of claim 6, wherein said measured rainfall data is indicative of the level of rainfall measured within said rain stat.

8. The method of claim 6, wherein said predictive rainfall data is indicative of the likelihood of rainfall in a geographic location over a selected period of future time.

9. The method of claim 6, wherein said restrictive watering data is indicative of the watering restrictions in a geographic location over a selected period of future time.

* * * * *